United States Patent
Power et al.

(10) Patent No.: US 12,397,426 B2
(45) Date of Patent: Aug. 26, 2025

(54) SYSTEMS AND METHODS FOR ONLINE ITERATIVE RE-PLANNING

(71) Applicant: Honda Motor Co., Ltd., Tokyo (JP)

(72) Inventors: Thomas J. Power, Ann Arbor, MI (US); Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 18/090,966

(22) Filed: Dec. 29, 2022

(65) Prior Publication Data
US 2024/0066695 A1 Feb. 29, 2024

Related U.S. Application Data (60) Provisional application No. 63/401,488, filed on Aug. 26, 2022.

(51) Int. Cl.
B25J 9/16 (2006.01)

(52) U.S. Cl.
CPC .......... *B25J 9/1664* (2013.01); *B25J 9/1612* (2013.01); *B25J 9/1689* (2013.01); *G05B 2219/39001* (2013.01); *G05B 2219/39511* (2013.01); *G05B 2219/40465* (2013.01)

(58) Field of Classification Search
CPC ...... B25J 9/1664; B25J 9/1612; B25J 9/1689; G05B 2219/39001; G05B 2219/39511; G05B 2219/40465
See application file for complete search history.

(56) References Cited

U.S. PATENT DOCUMENTS

| | | |
|---|---|---|
| 9,975,242 B1 | 5/2018 | Stubbs et al. |
| 2020/0039073 A1* | 2/2020 | Diankov ............... B25J 9/1669 |
| 2021/0154832 A1* | 5/2021 | Truebenbach ....... B25J 17/0241 |
| 2021/0299866 A1* | 9/2021 | Felip Leon ........... B25J 9/1697 |
| 2023/0166398 A1 | 6/2023 | Fan et al. |
| 2023/0241771 A1 | 8/2023 | Sriraman et al. |

(Continued)

OTHER PUBLICATIONS

A. Agrawal, B. Amos, S. Barratt, S. Boyd, S. Diamond, and Z. Kolter, "Differentiable convex optimization layers," in Advances in Neural Information Processing Systems, 2019.

(Continued)

*Primary Examiner* — Thomas E Worden
*Assistant Examiner* — Jay Khandpur
(74) *Attorney, Agent, or Firm* — Rankin, Hill & Clark LLP (57) ABSTRACT

Systems and methods for online iterative re-planning are provided herein. In one embodiment, a method includes receiving, at a first time step, a first grasp and an initial object pose of an agent. The method also includes generating a first set of candidate object trajectories based on the first grasp and the initial object pose. Candidate object trajectories of the first set of candidate object trajectories provide a number object poses from the initial object pose to a goal for a number of future time steps after the first time step. The method further includes calculating contact points for grasps associated with each candidate object trajectory of the first set of candidate object trajectories. The method further includes selecting a first candidate object trajectory from the first set of candidate object trajectories. The method includes causing the agent to execute the first candidate object trajectory at a second time step.

20 Claims, 6 Drawing Sheets

(56) References Cited

U.S. PATENT DOCUMENTS

2023/0294277 A1* 9/2023 Yang ............... G05B 19/4155 700/217
2024/0139946 A1* 5/2024 Kojima ................. B25J 9/16

OTHER PUBLICATIONS

B. Amos and J. Z. Kolter, "OptNet: Differentiable optimization as a layer in neural networks," in Proceedings of the 34th International Conference on Machine Learning, ser. Proceedings of Machine Learning Research, vol. 70. PMLR, 2017, op. 136-145.

Y. Du and I. Mordatch, "Implicit generation and modeling with energy based models," in Advances in Neural Information Processing Systems, H. Wallach, H. Larochelle, A. Beygelzimer, F. d'Alch'e-Buc, E. Fox, and R. Garnett, Eds., vol. 32. Curran Associates, Inc., 2019. [Online]. Available: https://proceedings.neurips.cc/paper/2019/file/378a063b8fdb1db941e34f4bde584c7d-Paper.pdf.

E. K. Gordon and R. S. Zarrin, "Online augmentation of learned grasping for more general in-hand tool manipulation," 2022.

M. Kalakrishnan, S. Chitta, E. Theodorou, P. Pastor, and S. Schaal, "Stomp: Stochastic trajectory optimization for motion planning," in 2011 IEEE International Conference on Robotics and Automation, 2011, pp. 4569-4574.

A. Lambert, A. T. Le, J. Urain, G. Chalvatzaki, B. Boots, and J. Peters, "Learning implicit priors for motion optimization," in 2022 International Conference on Intelligent Robots and Systems (IROS), 2022.

J. Ortiz, A. Clegg, J. Dong, E. Sucar, D. Novotny, M. Zollhoefer, and M. Mukadam, "isdf: Real-time neural signed distance fields for robot perception," in Robotics: Science and Systems, 2022.

J. J. Park, P. Florence, J. Straub, R. Newcombe, and S. Lovegrove, "Deepsdf: Learning continuous signed distance functions for shape representation," in The IEEE Conference on Computer Vision and Pattern Recognition (CVPR), Jun. 2019.

R. S. Zarrin and K. Yamane, "Hybrid model and learning-based planning and control of in-hand manipulation," 2020.

Office Action of U.S. Appl. No. 18/080,623 dated May 27, 2025, 38 pages.

* cited by examiner

SYSTEMS AND METHODS FOR ONLINE ITERATIVE RE-PLANNING

CROSS-REFERENCE TO RELATED APPLICATIONS

This application claims the benefit of U.S. Provisional Patent Application, Ser. No. 63/401,488 entitled "COMBINING SAMPLE-BASED AND GRADIENT-BASED TRAJECTORY OPTIMIZATION FOR DEXTEROUS MANIPULATION WITH LEARNED COST", filed on Aug. 26, 2022; the entirety of the above-noted application(s) is incorporated by reference herein. The present application is related to co-pending U.S. patent application Ser. No. 18/080,623 filed on Dec. 13, 2022 entitled "GRASP SELECTION". The co-pending application is incorporated herein by reference, but is not admitted to be prior art with respect to the present application.

BACKGROUND

Dexterous in-hand manipulation is a challenging robotics task which involves re-orientating an object from an initial pose to a goal pose while grasping the object. Re-orientating an object in-hand may be necessary when some task requires a certain object pose or grasp that is different from the initial grasped pose.

BRIEF DESCRIPTION

In one embodiment, a system for online iterative re-planning is provided. The system includes a processor and a memory storing instructions. When executed by the processor, the instructions cause the processor to receive, at a first time step, a first grasp and an initial object pose of an agent. When executed by the processor, the instructions also cause the processor to generate a first set of candidate object trajectories based on the first grasp and the initial object pose. Candidate object trajectories of the first set of candidate object trajectories provide a number object poses from the initial object pose to a goal for a number of future time steps after the first time step. When executed by the processor, the instructions further cause the processor to calculate contact points for grasps associated with each candidate object trajectory of the first set of candidate object trajectories. When executed by the processor, the instructions yet further cause the processor to select a first candidate object trajectory from the first set of candidate object trajectories based on a learned neural network cost model trained using offline data associated with the agent. When executed by the processor, the instructions further cause the processor to cause the agent to execute the first candidate object trajectory at a second time step of the number of future time steps.

According to another aspect, a method for online iterative re-planning is provided. The method includes receiving, at a first time step, a first grasp and an initial object pose of an agent. The method also includes generating a first set of candidate object trajectories based on the first grasp and the initial object pose. Candidate object trajectories of the first set of candidate object trajectories provide a number object poses from the initial object pose to a goal for a number of future time steps after the first time step. The method further includes calculating contact points for grasps associated with each candidate object trajectory of the first set of candidate object trajectories. The method yet further includes selecting a first candidate object trajectory from the first set of candidate object trajectories based on a learned neural network cost model trained using offline data associated with the agent. The method includes causing the agent to execute the first candidate object trajectory at a second time step of the number of future time steps.

According to yet another aspect, a non-transitory computer readable storage medium storing instructions that when executed by a computer having a processor to perform a method for online iterative re-planning is provided. The method includes receiving, at a first time step, a first grasp and an initial object pose of an agent. The method also includes generating a first set of candidate object trajectories based on the first grasp and the initial object pose. Candidate object trajectories of the first set of candidate object trajectories provide a number object poses from the initial object pose to a goal for a number of future time steps after the first time step. The method further includes calculating contact points for grasps associated with each candidate object trajectory of the first set of candidate object trajectories. The method yet further includes selecting a first candidate object trajectory from the first set of candidate object trajectories based on a learned neural network cost model trained using offline data associated with the agent. The method includes causing the agent to execute the first candidate object trajectory at a second time step of the number of future time steps.

DETAILED DESCRIPTION

Generally described, a new online iterative re-planning method is provided. This method may use optimization of learned cost models and a signed-distance function (SDF) of the object to select contact points on the object. Previous methods may use a finite number of manually specified contact points which may lie arbitrarily on the object surface. In addition, and as disclosed herein, an online iterative re-planning method is provided which plans a sequence of object poses and grasps for dexterous in-hand manipulation. The existing methods typically did not use feedback from the actual achieved grasps. By incorporating feedback, the method may achieve improved robustness and failure recovery. The proposed planning method may be extendable to the case where there is parametric uncertainty in object parameters for improved robustness.

Controlling a multi-fingered hand to manipulate a tool is provided. The goal may be to move the tool from a start pose to a goal pose. Once at the goal pose, the tool may be grasped such that the multi-fingered hand may apply a task wrench. The higher-level planner may select a sequence of object poses and grasps. Grasps may be specified by contact locations on the surface of the object for each finger that is in contact. This means that the grasp may be parameterized by both continuous and discrete variables (the contact locations and the fingers that are in contact). In addition, the sequence of object poses and grasps should be feasible, i.e. it must be able to move from one object pose to the next and from one grasp to the next while keeping hold of the object. Once such a trajectory has been chosen, existing algorithms may track this trajectory using lower-level controllers.

A method for online re-planning of trajectory is provided for in-hand manipulation of tools. At each timestep, the planner may receive the current grasp and object pose and generates a plan for the remainder of the trajectory. After generating this trajectory, lower level controllers may be used to transition towards the next sequence in the plan. After this, the actual achieved pose and grasp are used as input to the planner for the next iteration. Trajectory optimization may be used to plan which requires a trajectory cost. In particular the planner may incorporate a novel grasp selection using sampling and gradient based optimization. This grasp selection may optimize a general grasp quality cost as well as a task-specific cost. This grasp selection may be used for tasks other than in-hand manipulation by choosing an appropriate task-specific cost. Due to the hybrid discrete and continuous trajectory, optimization is not easily performed via gradient based methods only. Therefore, a combination of gradient-based methods and sample-based methods to perform the grasp selection may be used. Existing cost functions used for planning are typically not easily parallelizable or differentiable. Learned neural network cost models may therefore be used to approximate these existing cost functions.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent. Exemplary systems include, but are not limited to: an electronic stability control system, an anti-lock brake system, a brake assist system, an automatic brake prefill system, a low speed follow system, a cruise control system, a collision warning system, a collision mitigation braking system, a velocity control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, and a sensory system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine or computer readable media, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

I. System Overview

Figure 1:
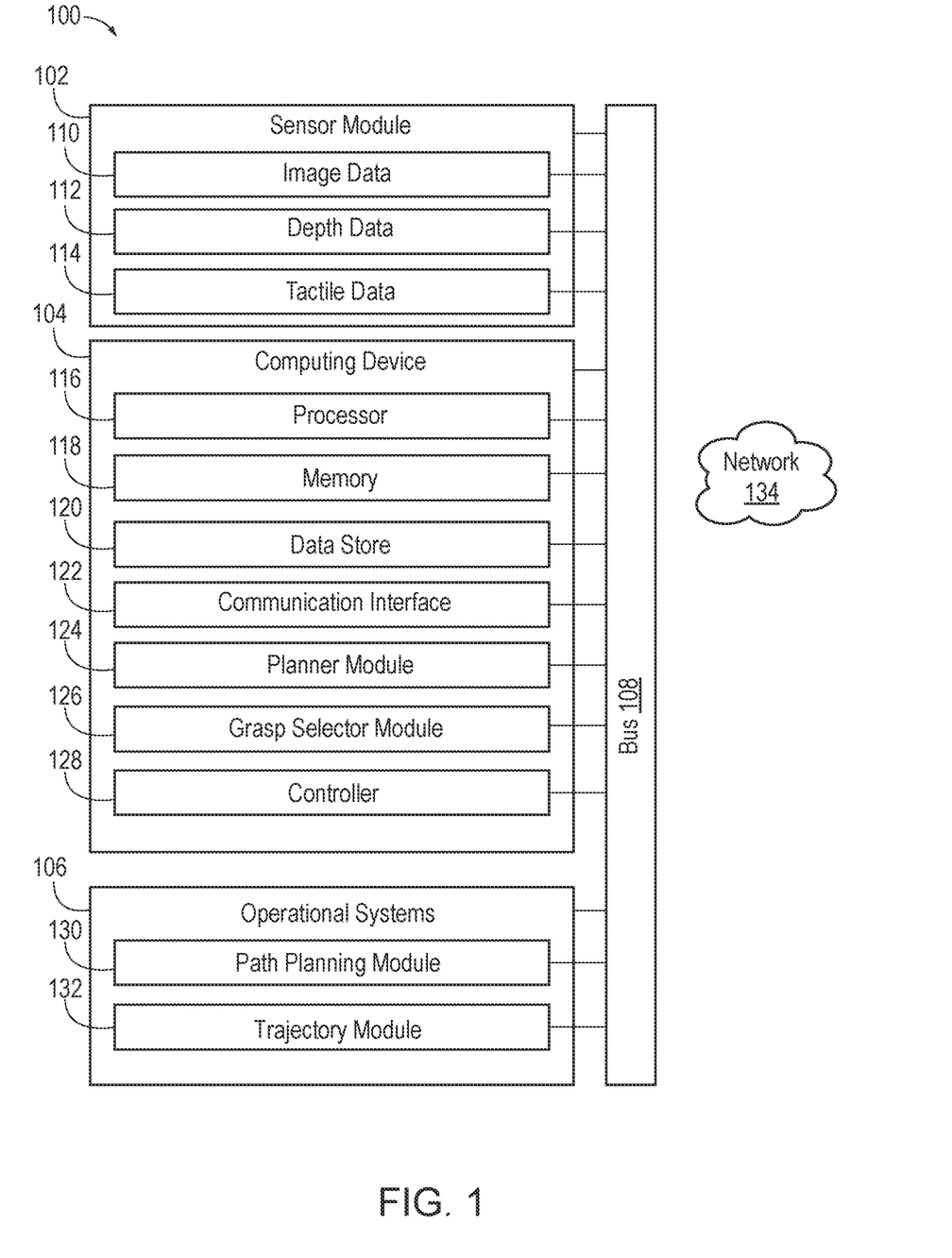
FIG. 1 is an exemplary component diagram of a system for online iterative re-planning, according to one aspect.

Referring now to the drawings, the drawings are for purposes of illustrating one or more exemplary embodiments and not for purposes of limiting the same. FIG. 1 is an exemplary component diagram of an operating environment 100 for online iterative re-planning, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device 104 may be implemented as a part of an agent. The agent may be bipedal, two-wheeled, four-wheeled robot, vehicle, or self-propelled machine. The autonomous agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of an agent. In other embodiments, the components and functions of the computing device 104 may be implemented, for example, with other devices (e.g., a portable device) or another device connected via a network (e.g., a network 134). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
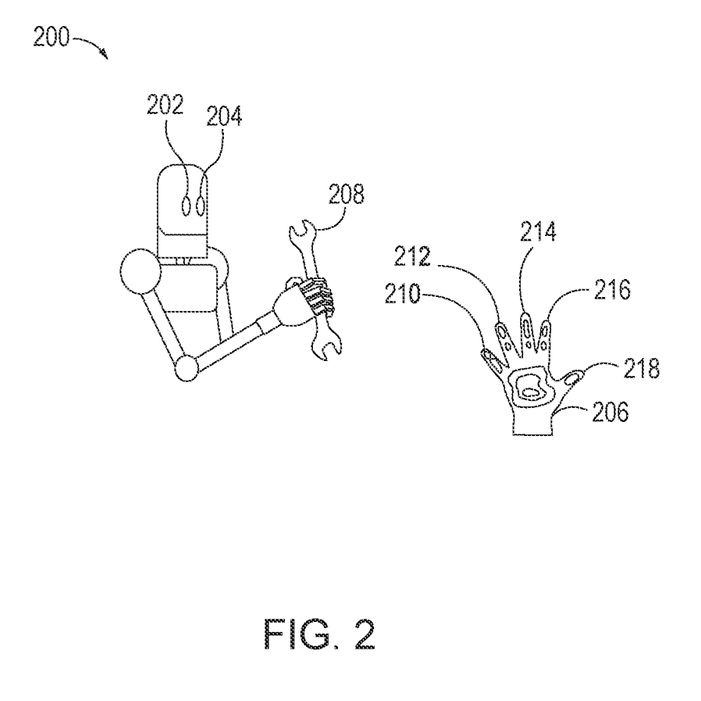
FIG. 2 is an exemplary agent environment of a system for online iterative re-planning, according to one aspect.

In some embodiments, the agent may be the agent 200 shown in FIG. 2. The agent 200 may include a number of sensors. For example, the agent 200 may include a first optical sensor 202, a second optical sensor 204, and a force sensor 206. The first optical sensor 202, the second optical sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 may receive image data 110, depth data 112, and tactile data 114 from the sensors. For example, the sensor module 102 may receive image data 110 from the first optical sensor 202, depth data 112 from the second optical sensor 204, and the tactile data 114 from the force sensor 206. The computing device 104 receives the image data 110, the depth data 112, and the tactile data 114 from the sensor module 102. Therefore, the image data 110, depth data 112, and tactile data 114 is raw sensor data received from their respective sensors.

Likewise, the image data 110, depth data 112, and tactile data 114 may include information about the sensors. For example, suppose the force sensor 206 is able to move. The image data 110, depth data 112, and tactile data 114 may include information about the force sensor 206 such as the relative position of the force sensor 206 to a reference point as measured by a sensor. The reference point may be the first optical sensor 202 or the second optical sensor 204. For example, the depth data 112 may include distance measurements from the second optical sensor 204 to the force sensor 206. Likewise, the tactile data 114 may include dimensions (e.g., width, height, length, etc.) of the force sensor 206. The force censor may measure various forces exerted by (e.g., torque) or experienced by (e.g., resistance) the agent 200.

The sensors 202-206 and/or the sensor module 102 are operable to sense a measurement of data associated with the agent 200, the operating environment 100, the object 208, the environment, and/or the operational systems 106 and generate a data signal indicating said measurement of data. These data signals may be converted into other data formats (e.g., numerical) and/or used by the sensor module 102, the computing device 104, and/or the operational systems 106 to generate other data metrics and parameters. It is understood that the sensors may be any type of sensor, for example, acoustic, electric, environmental, optical, imaging, light, pressure, force, thermal, temperature, proximity, gyroscope, and accelerometers, among others.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes a planner module 124, a grasp selector module 126, and a controller 128, for online iterative re-planning facilitated by the components of the operating environment 100.

The planner module 124, the grasp selector module 126, and the controller 128 may be an artificial neural network that act as a framework for machine learning, including deep learning. For example, the planner module 124, the grasp selector module 126, and the controller 128 may be a convolution neural network (CNN). In another embodiment, the planner module 124, the grasp selector module 126, and the controller 128 may further include or implement concatenator, a deep neural network (DNN), a recurrent neural network (RNN), a 3D Convolutional Neural Network (3DCNN) and/or Convolutional Long-Short Term Memory (ConvLSTM).

The computing device 104 is also operably connected for computer communication (e.g., via the bus 108 and/or the communication interface 122) to one or more operational systems 106. The operational systems 106 may include, but are not limited to, any automatic or manual systems that may be used to enhance the agent 200, operation, and/or propulsion. The operational systems 106 may be dependent on the implementation. For example, the operational system 106 may include a path planning module 130 and a trajectory module 132. The path planning module 130 monitors, analyses, operates the agent 200 to some degree. The path planning module may define a path as a course or direction through space. The path may be defined by a number of waypoints. The trajectory module 132 applies time points to the path, for example, by assigning time stamps to the waypoints. As another example, the operational systems 106 may include manipulating the object 208 to affect a target. The operational systems 106 also include and/or are operably connected for computer communication to the sensor module 102. For example, one or more sensors of the sensor module 102 may be incorporated with the path planning module 130 to monitor characteristics of the environment or the agent 200, for example, based on the tactile data 114.

The sensor module 102, the computing device 104, and/or the operational systems 106 are also operatively connected for computer communication to the network 134. The network 134 is, for example, a data network, the Internet, a wide area network (WAN) or a local area (LAN) network. The network 134 serves as a communication medium to various remote devices (e.g., databases, web servers, remote servers, application servers, intermediary servers, client machines, other portable devices). Detailed embodiments describing exemplary methods using the system and network configuration discussed above for online iterative re-planning will now be discussed in detail.

II. Methods for Online Iterative Re-Planning

Figure 3:
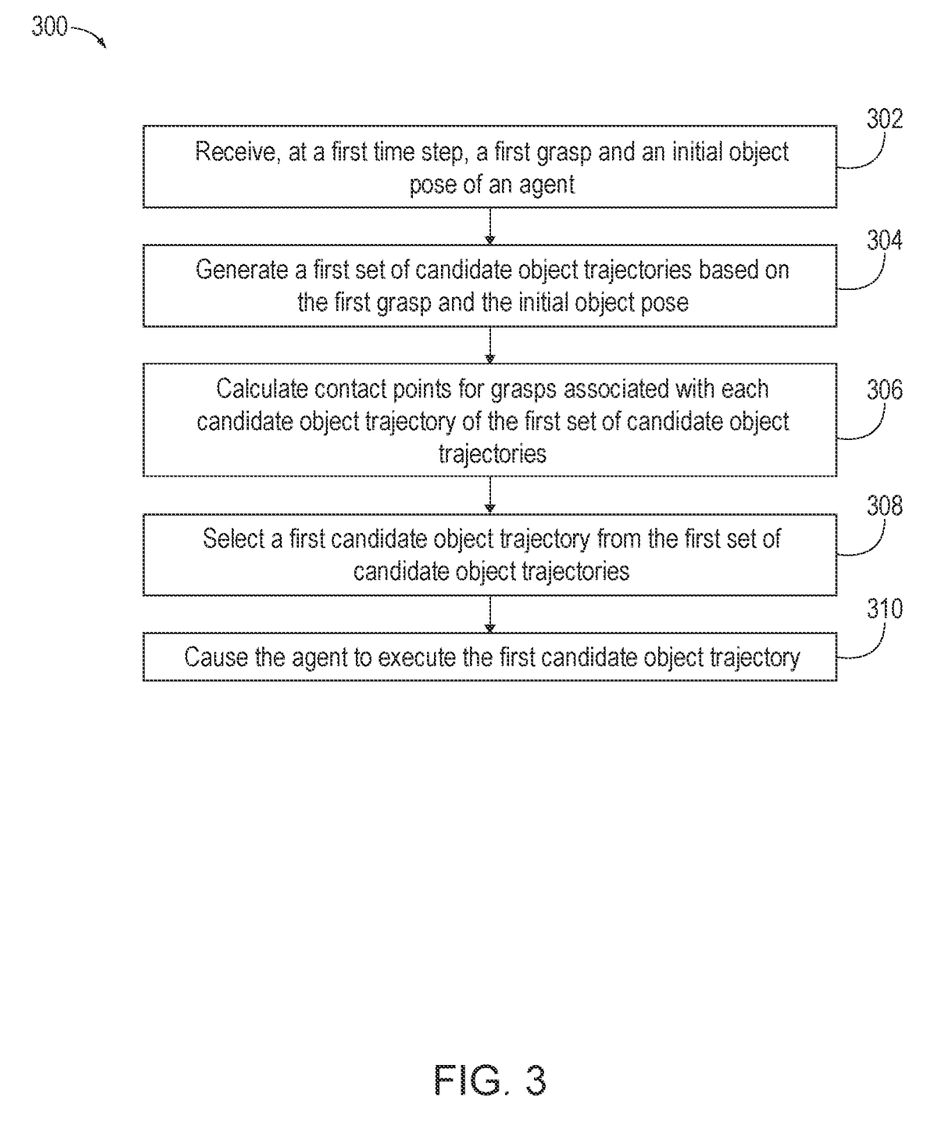
FIG. 3 is an exemplary process flow of a method for online iterative re-planning, according to one aspect.

Referring now to FIG. 3, a method 300 for online augmentation for learned grasping will now be described according to an exemplary embodiment. FIG. 3 will be described with reference to FIGS. 1, 2, 4, and 6. For simplicity, the method 300 will be described as a sequence of blocks, but it is understood that the blocks of the method 300 may be organized into different architectures, elements, stages, and/or processes.

Figure 4:
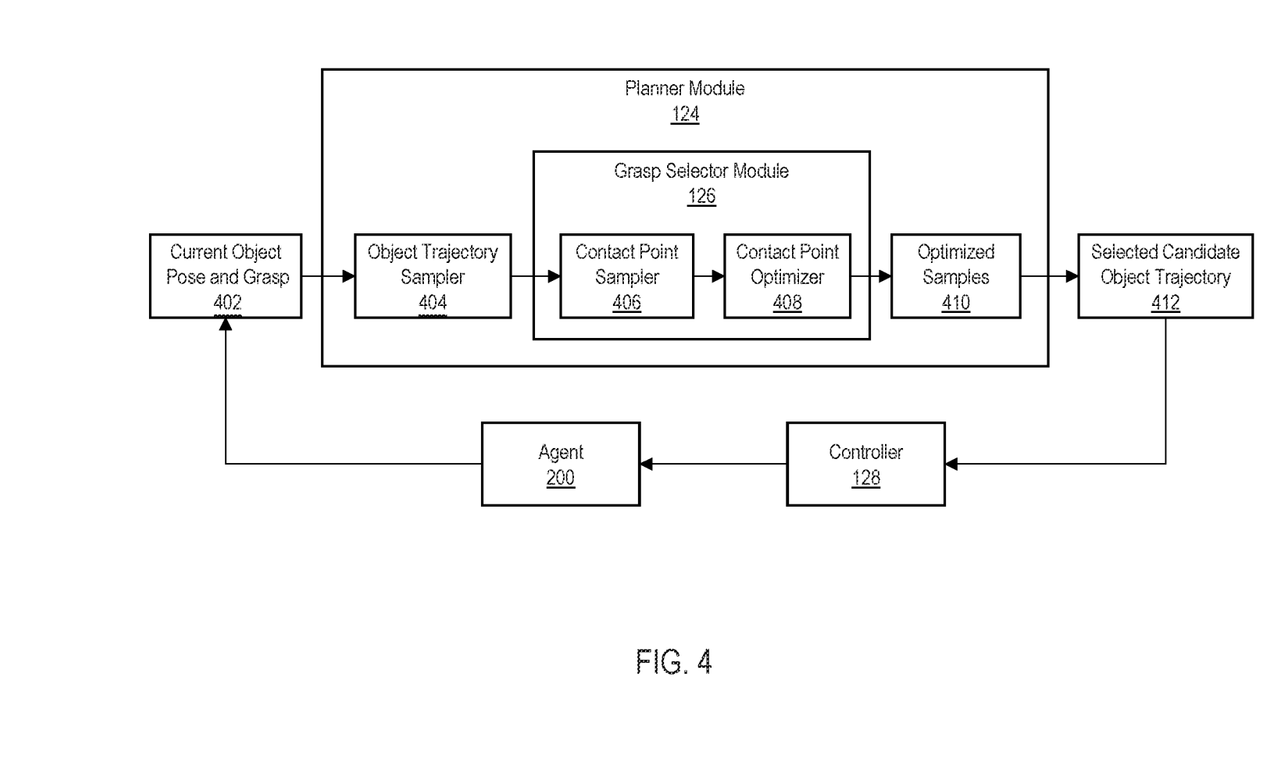
FIG. 4 are illustrations of an exemplary implementation of a system for online iterative re-planning, according to one aspect.

At block 302, the method 300 includes the planner module 124 receiving, at a first time step, a first grasp and an initial object pose of an agent 200. The first grasp includes contact points, $c_t$, and the initial object pose $o_t$ of an agent 200 are based on state information from the environment of the agent 200, as shown in FIG. 4. The first grasp and/or the initial object pose, $o_t$, may be selected based on state information, a known state, or a random selection.

The initial object pose, $o_t$, may be determined based on a signed distance field (SDF) is a function $\phi(x)$: $R^3 \rightarrow R$ which maps a point in space to the distance to the nearest surface of an object 208. The level set $\phi(x)=0$ implicitly defines the surface of the object 208. It is often computed offline and stored in a voxel-grid, but a neural network may be used to learn the function.

A DeepSDF models may be learned using data generated from a mesh of the object 208. It is also possible to learn SDF models generated from point cloud based on the image data 110, the depth data 112, and/or the tactile data 114. The initial object pose, $o_t$, may be based on any neural-network based SDF model. Using a learned SDF enables us to find the contact normal at the surface as the gradient $n=\nabla_x\phi(x)$ and compute it via back-propagation through the learned model. The contact normal will be used as an input to the wrench cost, thus the gradient of the contact normal with respect to the contact point, $c_t$, is computed as the second derivative $\nabla_x n = \nabla_x^2 \phi(x)$.

The agent 200 is able to grasp the object 208 in the environment using one or more links. In an embodiment with an at least partially humanoid robot, the grasp may be performed by links. In this manner, links are portions of the agent 200 used in contact with the object 208 to achieve a grasp, such as the initial grasp. In one embodiment, the links may include a number of end effector(s) that operate to mimic the function of human fingers. For example, the agent 200 may include a first end effector 210, a second end effector 212, a third end effector 214, a fourth end effector 216, and a fifth end effector 218 that is opposable such that it may move toward and touch the other end effector 210-216. When in contact with the object 208, the end effector 210-218 are links of the agent 200 with the object 208. The links may also include other portions of an agent 200 such as a grasper, rod, or clamp, among others.

A set of grasps may include any grasp that may achieved by the agent 200 based on the state of the agent 200 at the given time step. For example, the first grasp of the object 208 at a first time step and includes a contact point $c_t$. A contact point includes contact pairs $\{p_O, p_R\}$ where $p_O$ is an object contact point on the object 208 in the object's reference frame and $p_R$ is an agent contact point on the agent 200 in the agent's reference frame. Each instance where a link of the agent 200 is or may be in contact with the object 208 is represented in a contact point $c_t$. For example, where the first end effector 210, the second end effector 212, the third end effector 214, and so on of the agent 200 are in contact with the object 208 may be represented as contact points $c_t$.

The contact points include contact pairs $\{p_O, p_R\}$ where $p_O$ is an object contact point on the object 208 in the object's reference frame and $p_R$ is an agent contact point on the agent 200 in the agent's reference frame. The object contact point, $p_O$, and/or the agent contact point, $p_R$, may be based on the state information, such object state information and/or agent state information.

The state information, including the agent state information and the object state information, may be received or determined from the sensor module 102 or the operational systems 106. For example, the image data 110 may correspond to the portion of the object 208 that is not occluded by the grasp of the agent 200 or the environment. For example, as shown in FIG. 2, the agent 200 is holding an object 208, shown here as a wrench, with a force sensor 206 represented by the end effectors 210-218 of the agent 200. The image data 110 may be image data, such as RGB data, YCB data, and/or YUV data. The image data may be used to determine a joint configuration of the end effectors 210-218 of the agent.

The state information may also be based on the depth data 112 about the object 208. The depth data 112 may be received from the second optical sensor 204. The depth data 112 may include a video sequence or a series of images, user inputs, and/or data from the operational systems 106, such as data from a Controller Area Network (CAN) bus including as pedal pressure, steer angle, etc. The depth data 112 may be received from the second optical sensor 204. The second optical sensor 204 may include radar units, lidar units, image capture components, ranging sensors, cameras, scanners (e.g., 2-D scanners or 3-D scanners), or other measurement components. For example, the depth data 112 from the second optical sensor 204 may be augmented by other sources, such as the first optical sensor 202, and/or remote devices (e.g., via the bus 108 and/or the communication interface 122).

The state information may also be based on the tactile data 114 received from the force sensor 206. The force sensor 206 may include tensile force sensors, compressions force sensors, tensile and force compression sensors, or other measurement components. The force sensor 206 may be with a Weiss gripper with GelSight tactile sensors. In some embodiments, the tactile data 114 is augmented as additional sensor data from other sources is received. For example, the tactile data 114 from the force sensor 206 may be augmented by other sources, such as additional force sensors (e.g., from a second hand of the agent 200), and/or remote devices (e.g., via the bus 108 and/or the communication interface 122). The planner module 124 may determine the agent contact points and the object contact points based on the tactile data 114.

The planner module 124 may also use the operational system 106, including but not limited to the agent systems, to determine the state information. For example, the trajectory module 132 may provide the planner module 124 with the state information from previous time steps. Based on the state information from the previous time steps, the planner module 124 may determine current state information, such as a current joint configuration of the end effector 210-218 of the agent 200. Therefore, using the image data 110, the depth data 112, the tactile data 114, and/or the operational systems, planner module 124 may determine At block 304, the method 300 includes the planner module 124 generating a first set of candidate object trajectories based on the first grasp and the initial object pose. Candidate object trajectories of the first set of candidate object trajectories provide a number object poses from the initial object pose to a goal for a number of future time steps after the first time step. For example, the goal may be to move the object 208 from the initial object pose $o_t$ to a goal pose $o_G$. The first set of candidate object trajectories is generated such that $o_G = o_T$.

A candidate object trajectory is defined as $\tau_t = (o_{t+1}, c_{t+1}, \ldots, o_T, c_T)$ where $o_T$ is a final object pose at a final time step and $c_T$ represents contact points of a final grasp at the final time step. The candidate object trajectory is defined to allow the agent 200 to move from one time step to a next time step until the final time step is achieved. For example, the first time step is associated with the first grasp that includes contact points, $c_t$, and the initial object pose $o_t$ of an agent 200 represented as $(o_t, c_t)$ and transition to a second grasp that includes contact points, $c_{t+1}$, and a next object pose $o_{t+1}$ of the agent 200 represented as $(o_{t+1}, c_{t+1})$. Once at $o_G$, the object 208 should be grasped such that the links may apply a task wrench, $w_G$. Since a grasp is specified by contact point, $c_t$, on the surface of the object 208, the grasp is parameterized by both continuous and discrete variables. Thus, in addition to the first set of candidate object trajectories is generated such that $o_G = o_T$, the first set of candidate object trajectories is also generated such that the task wrench, $w_G$ is inside the wrench conde of the grasp $c_T$.

In this manner, a first set of candidate trajectories $o_{t:T}$ is generated from the initial object pose to the goal being sampled as $\tau_t^k = o_{t:T}^k$ and reflect the current object pose and grasp 402. As the systems and methods described herein are directed to online iterative re-planning, the current object pose and grasp 402 may reflect a first grasp that includes contact points, $c_t$, and an object pose $o_t$ at any time step t including the first time step, the second time step, and so on.

In one embodiment the planner module 124 includes an object trajectory sampler 404, shown in FIG. 4. The object trajectory sampler 404 receives the current object pose and grasp 402, here the first grasp that includes contact points, $c_t$, and the initial object pose $o_t$. The object trajectory sampler 404 may generate a set of candidate object trajectories, here the first set of candidate object trajectories, based on paths to the goal, such as a straight-line path to the goal. Gaussian perturbations may be sampled by the object trajectory sampler 404 such that the end points are constrained and variance is highest in the middle of the trajectory. By sampling in this manner, each candidate object trajectory of the first set of candidate object trajectories reaches the goal.

At block 306, the method 300 includes the grasp selector module 126 calculating contact points for grasps associated with each candidate object trajectory of the first set of candidate object trajectories. In one embodiment, the grasp selection may be calculated by randomly sampling the fingers in contact and then performing continuous optimization of the contact points due to the mix of discrete and continuous decision variables. For example, a contact sequence may be constrained by assuming that between grasp $c_t$ at a first time step and $c_{t+1}$ at a next time step, an end effector may be removed from contact or added to contact at a new contact location on the object 208. Accordingly, the grasps may be constrained by a requiring that multiple end effectors not be added or removed at the same time. Constraint also include end effectors not changing directly from one contact location to another without being removed first. The constraints allow the contact sequence to be processed by lower-level controllers.

The contact sequence as $(c_t, \Delta c_{t+1}, \ldots, \Delta c_T)$ which is the current grasp at the first time step and a sequence of grasp changes over subsequent time steps. Each grasp change $\Delta c_t = (i, c)_t$ is parameterized by an integer representing which end effector (if any) to change, and a contact point. If an end effector at the previous grasp is in contact, then this change removes that end effector from contact and the contact point is ignored. If an end effector is currently in contact, then the end effector is added to contact at contact location c. The grasp sequence is initialized to be a sequence of null changes.

In one embodiment, the grasp selector module 126 includes a contact point sampler 406 and contact point optimizer 408 shown in FIG. 4. The contact point sampler 406 may use a current nominal grasp sequence. In one embodiment, for each timestep with some probability, the contact point sampler 406 re-samples for each link and a new contact point c. The contact points may be sampled from a zero mean Gaussian. In this manner, $\Delta c_{t+1:T}$ is sampled and then contact points for grasps associated with each candidate object trajectory of the first set of candidate object trajectories are calculated as $c_{t+1:T}$ from $\Delta c_{t+1:T}$ and $c_t$. Accordingly, the grasp selection is performed, represented as $c_{t:T}^k = \text{GraspSelect}(o_{t:T}^k)$.

At block 308, the method 300 includes the grasp selector module 126 selecting a first candidate object trajectory 412 from the first set of candidate object trajectories $o_{t:T}$. The first candidate object trajectory 412 is selected based on the contact points for grasps associated with each candidate object trajectory of the first set of candidate object trajectories $c_{t+1:T}$. For example, once the contact points $c_{t+1:T}$ for grasps associated with each candidate object trajectory of the first set of candidate object trajectories $o_{t:T}$ are sampled at block 306 by the contact point sampler 406, then the contact points $c_{t+1:T}$ for grasps associated with the candidate object trajectories are optimized using a learned neural network cost model, such as a cost function $J(\tau)$ by the contact point optimizer 408 such that the first set of candidate object trajectories are optimized samples 410.

The learned neural network cost model is a generative model based on feasible outcomes. The feasible outcomes may be based on offline data such as wrench cost data, kinematics cost data, superposition cost data, as will be discussed in greater detail below. The learned neural network cost model is based on the form:

$$J(\tau_t) = L_{task} + L_{grasp}$$

In particular, the grasp selection may be incorporated using the contact point sampler 406 to sample and the contact point optimizer 408 gradient based optimization. This grasp selection optimizes a general grasp quality cost $L_{grasp}$ as well as a task-specific cost $L_{task}$ to generate the first set of candidate object trajectories are optimized samples 410 such that the first candidate object trajectory 412 is selected from the optimized samples 410. In one embodiment, a gradient descent may be used to minimize this loss function for each sample using $\nabla_\tau J(\tau)$. The contact point optimizer 408 optimizes the contact points based on the constraints. For example, since moving an end effectuator involves first removing that end effectuator, only contact points for an end effectuator that has just been added to contact is optimized. While $J(\tau)$ includes a cost, which encourages the contact points to be on the surface of the object 208, the contact points may deviate from the surface of the object 208. To avoid this, a projected gradient descent may be used, where the planner module 124 iterates between optimizing $J(\tau)$ and minimizing $|\phi(c)\phi$ to project the contact points onto the surface of the object 208. The trajectory that has the lowest cost for execution is selected from the first set of candidate object trajectories $o_{t:T}$ as the first candidate object trajectory 412 according to $\tau_t^* = \arg\min J(o_{t:T}, c_{t:T})^k$. Accordingly, an object trajectory is selected from a set of candidate object trajectories for the corresponding time step.

In one embodiment, the learned neural network cost model may be represented as an energy based model such that the energy based model is a generative model that learns unnormalized density, $p_\theta(x) \propto \exp(-E_\theta(x))$. $E_\theta$ is a neural network with parameter $\theta$. The energy based model is trained via contrastive divergence to minimize the objective given by the energy function:

$$L = E_D(-E_\theta(x)) - E_{p\theta}(-E_\theta(x))$$

The first expectation is with respect to the data (e.g., positive examples), and the second expectation is with respect to samples generated from the model (e.g., negative examples). These may be generated via Langevin dynamics with the energy function. Thus, the energy of positive examples is minimized while the energy of negative examples maximized. In this manner, the grasp selector module 126 selecting a first candidate object trajectory 412 from the first set of candidate object trajectories $o_{t:T}$ based on the learned neural network cost model.

The learned neural network cost model may be based on offline data. Offline data may be associated with the agent 200, such as a specific agent or type of agent. The offline data is data that includes a number of feasible outcomes for an agent. The feasible outcomes are possible and/or allowable physical orientation, such as position, grasp, velocity, acceleration, path plan, etc. The feasible outcomes may be based on cost functions, such a wrench cost function, superposition cost, and/or inverse kinematics cost, among others.

In one embodiment, the wrench cost may be found by optimizing the contact point locations to be able to resist the external wrench. For example, given a desired wrench cost $w=(f_{total}, \tau_{total})$ and grasp c, a following optimization may be:

$$w^* = \operatorname{argmin}_{f_1,\ldots,f_K} = \left\| f_{total} - \sum_k^K f_k \right\|^2 + \| \tau_{total} - p_k \times f_k \|^2$$

$$\text{s.t. } A_k f_k \le 0$$

where the $p_k$ vector is from the object center of mass to the contact point, $f_k$ and $A_k$ are the contact force and the linearized friction cone for the kth finger. Both $p_k$ and $A_k$ are functions of the contact points of the grasp, and the contact normal which is a function of the geometry of the object 208 and the grasp contact point. To avoid an external wrench $w_{ext}$ therefore, the desired wrench is set to $-w_{ext}$ and the wrench error is $\|w_{ext}+w^*\|^2$. All forces are vectors and may be in the frame of reference of the object 208.

This cost function is a quadratic and thus may be optimized fairly quickly. However, to evaluate this cost in parallel and differentiate through it, the cost function is prohibitively slow to use inside a re-planning loop to perform in an online manner with current data. Instead, the learned neural network cost model estimates the cost based on the feasible outcomes. The feasible outcomes include a large dataset of grasps $c_k$, contact normals $n_k$, and desired wrenches $w_d$ in the object frame of the object 208. The contact force optimization is calculated for each element of the dataset to generate error labels $e=\|w_d-w^*\|^2$. The learned neural network cost model is parameterized as a neural network with four layers and ReLU activations. In this manner the learned neural network cost model is trained based on the energy function. In addition to this cost, the energy of the negative examples is maximized. In this way the resulting the learned neural network cost model has low energy for low-error force optimizations, and high energy for both high-error force optimizations, as well as data that is outside the training distribution. For example, to evaluate the wrench cost for a grasp and object pose the external wrench is first transformed to the object frame with the object pose, compute the contact normals at the grasp using the object SDF, and then evaluate the learned neural network cost model.

In another embodiment, the learned neural network cost model may be trained based on the superposition cost between the finger and the object 208 when moving between contact points. Waypoints may be generated from the current finger position to the contact point and check the signed distance at each waypoint using ϕ. Since the waypoint locations are a linear function of $c_k$ and $c_{k+1}$, the derivative of the superposition cost is calculated with respect to the contact point using $\nabla x \phi(x)$.

In yet another embodiment, the learned neural network cost model may be trained based on the inverse kinematics cost. Like wrench cost, the inverse kinematics is prohibitively slow to be performed online. Instead, a set of feasible outcomes is received offline, including a large dataset of joint configurations for the fingers. Forward kinematics may be performed for all of these joint configurations to generate finger locations. A check is performed at each of these joint configurations to determine which joint configurations are feasible outcomes. The learned neural network cost model is trained in a similar manner as described above with respect to wrench cost, for example, using contrastive divergence to minimize the energy of positive example, while maximizing the energy of negative examples and artificially generated negative examples from the model.

At block 310, the method 300 includes the path planning module 130 causing the agent to execute the first candidate object trajectory at a second time step of the number of future time steps. In one embodiment, the path planning module 130 may receive the selected candidate object trajectory. The path planning module 130 may then cause the agent 200 to move the object 208 toward the goal pose $o_G$.and/or grasp the object 208 in order to apply a task wrench, $w_G$. For example, the path planning module 130 may cause the links of the agent 200 to exert a mechanical force on a target using the object 208. Additionally or alternatively, a policy may be generated based on the selected candidate object trajectory using the contact point (s) to pretrain the agent 200 or another agent on the operation of the object 208 with respect to a target.

Figure 5:
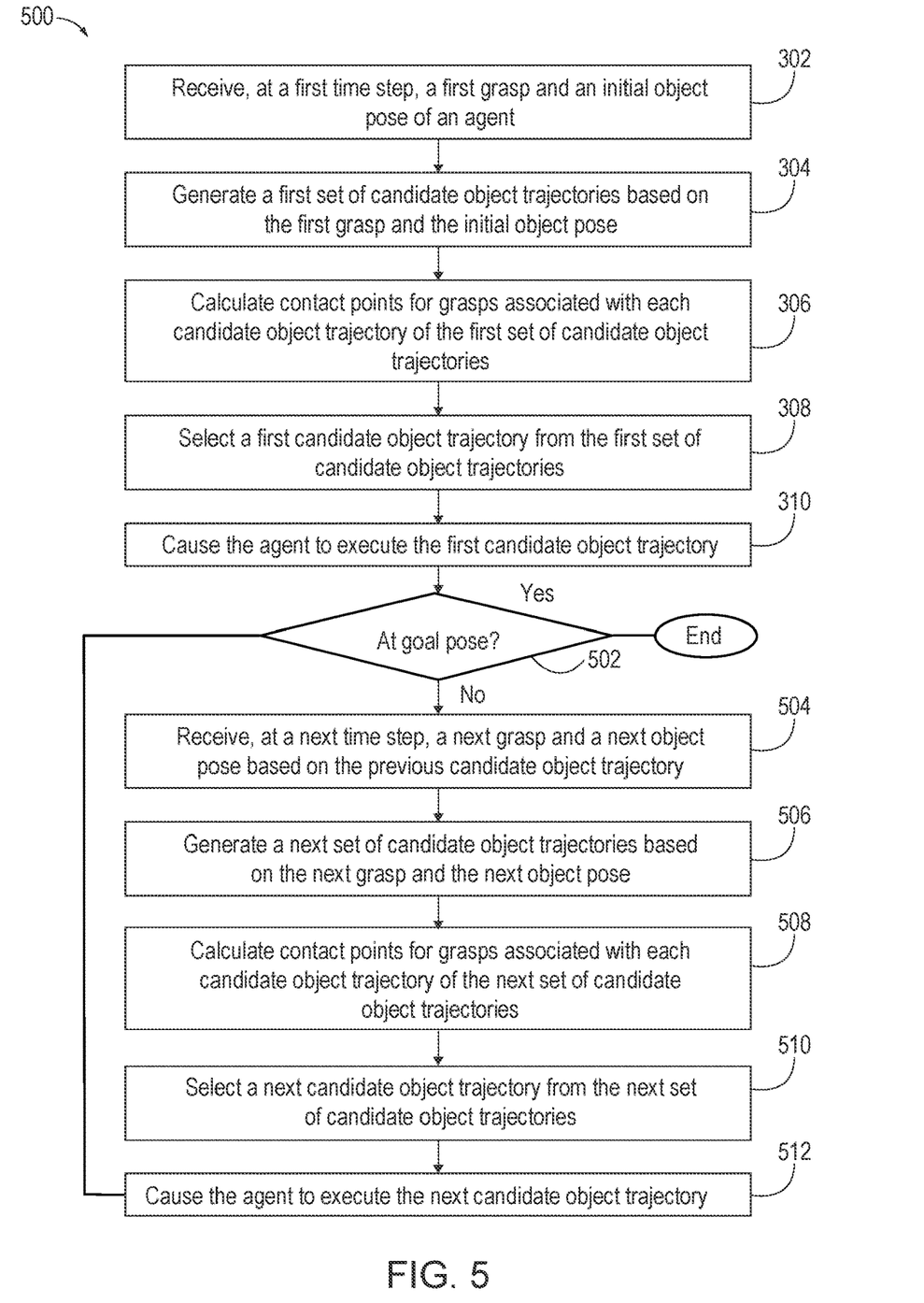
FIG. 5 is an exemplary process flow of a method for online iterative re-planning, according to one aspect.

Referring now to FIG. 5, a method 500 for online augmentation for learned grasping will now be described according to an exemplary embodiment. FIG. 5 will be described with reference to FIGS. 1-4, and 6. For simplicity, the method 500 will be described as a sequence of blocks, but it is understood that the blocks of the method 500 may be organized into different architectures, elements, stages, and/or processes. Furthermore, the method 500 includes blocks of the method 300, which operate in a similar manner as described above.

At block 302, the method 500 includes the planner module 124 receiving, at a first time step, the first grasp that includes contact points, $c_t$, and the initial object pose $o_t$ of the agent 200.

At block 304, the method 500 includes the planner module 124 generating the first grasp that includes contact points, $c_t$, and the initial object pose $o_t$. As described above, the candidate object trajectories of the first set of candidate object trajectories provide a number object poses from the initial object pose to a goal for a number of future time steps after the first time step.

At block 306, the method 500 includes the grasp selector module 126 calculating contact points for grasps associated with each candidate object trajectory of the first set of candidate object trajectories.

At block 308, the method 500 includes the planner module 124 selecting a first candidate object trajectory from the first set of candidate object trajectories based on a learned neural network cost model trained using offline data associated with the agent 200, as described above with respect to the method 300.

At block 310, the method 500 includes the controller 128 causing the agent to execute the first candidate object trajectory at a second time step of the number of future time steps. However, as described above, the systems and methods herein describe online iterative re-planning and may include re-planning at the future time steps.

At block 502, the method 500 determines if the agent 200 has reached goal. The determination may be based on the state information including the object state information and/or the agent state information. In one embodiment, the determination may be based on the image data 110, the depth data 112, and the tactile data 114. In another embodiment, the determination may be based on the SDF being a function $\phi(x): R^3 \rightarrow R$.

If it is determined that the agent 200 has reached the goal, the method 500 ends. However, if it is determined that the agent 200 has not reached the goal, then the method 500 proceeds to block 504.

At block 504, the method 500 includes the planner module 124 receiving, at a next time step, a next grasp and a next object pose based on the selected candidate object trajectory of the agent 200. For example, continuing the method from the first time step, the planner module 124 receives, at the second time step, a second grasp and a next object pose based on the first candidate object trajectory of the agent. The second grasp and a next object pose may additionally be based on SDF, the state information including the object state information and/or the agent state information, the image data 110, the depth data 112, and the tactile data 114, as described above with respect to block 302 of the method 300.

At block 506, the method 500 includes the planner module 124 generating a second set of candidate object trajectories based on the next grasp, in this example the second grasp, and the next object pose. Therefore, in this example, the candidate object trajectories of the second set of candidate object trajectories provide a number object poses from the next object pose to the goal for a number of future time steps after the second time. As described above, the candidate object trajectory is defined as $\tau_t = (o_{t+1}, c_{t+1}, \ldots, o_T, c_T)$ but here time step t is the second time step, accordingly time step t+1 is the third time step, and so on to the goal.

In addition to the second set of candidate object trajectories is generated such that $o_G = o_T$, the second set of candidate object trajectories is also generated such that the task wrench, $w_G$ is inside the wrench conde of the grasp $c_T$. The second set of candidate trajectories $o_{t:T}$ is generated from the next object pose to the goal being sampled as $\tau_t^k = o_{t:T}^k$ and reflect the current object pose and grasp 402.

At block 508, the method 500 includes the grasp selector module 126 calculating contact points for grasps associated with each candidate object trajectory of the second set of candidate object trajectories. As discussed above, the contact point sampler 406 may use a current nominal grasp sequence. In one embodiment, for each timestep with some probability, the contact point sampler 406 re-samples for each link and a new contact point c.

At block 510, the method 500 includes the planner module 124 selecting a second candidate object trajectory from the second set of candidate object trajectories based on the learned neural network cost model. As described above with respect to block 308, in one embodiment, the contact points $c_{t+1:T}$ for grasps associated with the candidate object trajectories are optimized using a cost function $J(\tau)$ by the contact point optimizer 408 such that the second set of candidate object trajectories are optimized samples 410.

At block 512, the method 500 includes the controller 128 causing the agent to execute the second candidate object trajectory at a second time step. The method ten returns to block 502 to if the agent 200 has reached the goal. If it is determined that the agent 200 has reached the goal, the method 500 ends. However, if it is determined that the agent 200 has not reached the goal, then the method 500 proceeds to block 504 for another iteration. Continuing the example from above, such an iteration would be the third iteration for a third time steps. Therefore, the systems and method described herein are iterative. Accordingly, the systems and methods described herein plan a sequence of object poses and grasps for the agent, such as dexterous in-hand manipulation. While existing methods do not use feedback from the actual achieved grasps, here feedback is incorporated to achieve improved robustness and failure recovery while requiring less processing power. The proposed planning method is extendable to the case where there is parametric uncertainty in object parameters for improved robustness.

Figure 6:
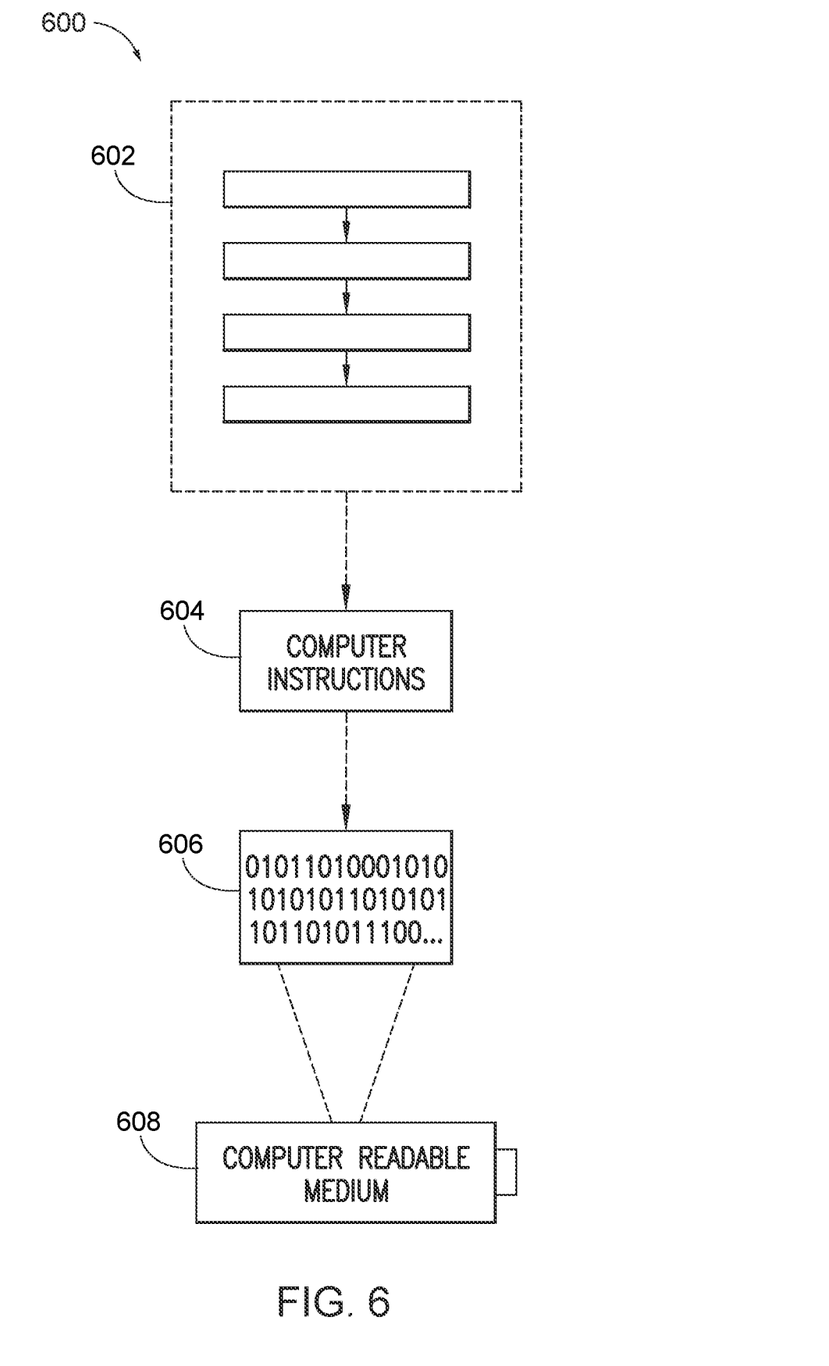
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein.

In this implementation 600, the processor-executable computer instructions 604 may be configured to perform a method 602, such as the method 300 of FIG. 3 or the method 500 of FIG. 5. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes," "having," "has," "with," or variants thereof are used in either the detailed description or the claims, such terms are intended to be inclusive in a manner similar to the term "comprising."

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for online iterative re-planning, comprising:
a processor; and
a memory storing instructions that when executed by the processor cause the processor to:
receive, at a first time step, a first grasp and an initial object pose of an agent;
generate a first set of candidate object trajectories based on the first grasp and the initial object pose, wherein candidate object trajectories of the first set of candidate object trajectories provide a number of object poses from the initial object pose to a goal for a number of future time steps after the first time step;
calculate contact points for grasps associated with each candidate object trajectory of the first set of candidate object trajectories;
select a first candidate object trajectory from the first set of candidate object trajectories by applying a learned neural network cost model with the contact points to calculate respective energy for each grasp, the learned neural network cost model being trained based on an energy function using offline data associated with the agent; and
cause the agent to execute the first candidate object trajectory at a second time step of the number of future time steps.

2. The system of claim 1, the memory storing instructions that when executed by the processor further cause the processor to:
receive, at the second time step, a second grasp and a next object pose based on the first candidate object trajectory of the agent;
generate a second set of candidate object trajectories based on the second grasp and the next object pose, wherein candidate object trajectories of the second set of candidate object trajectories provide a number of object poses from the next object pose to the goal for a number of future time steps after the second time;
calculate contact points for grasps associated with each candidate object trajectory of the second set of candidate object trajectories;
select a second candidate object trajectory from the second set of candidate object trajectories based on the learned neural network cost model; and
cause the agent to execute the second candidate object trajectory at a second time step.

3. The system of claim 1, wherein candidate object trajectories are selected for the number of future time steps until the agent reaches the goal.

4. The system of claim 1, wherein the agent includes a plurality of end effectors for achieving a grasp of an object, wherein the grasp includes a contact sequence of the contact points.

5. The system of claim 4, wherein the grasp is based on adding or removing an end effector of the plurality of end effectors from or to the object.

6. The system of claim 1, wherein the first candidate object trajectory is selected based on a sample-based and gradient-based trajectory optimization.

7. The system of claim 1, wherein the first candidate object trajectory is selected based on a low cost optimization.

8. A method for online iterative re-planning, comprising;
receiving, at a first time step, a first grasp and an initial object pose of an agent;
generating a first set of candidate object trajectories based on the first grasp and the initial object pose, wherein candidate object trajectories of the first set of candidate object trajectories provide a number of object poses from the initial object pose to a goal for a number of future time steps after the first time step;
calculating contact points for grasps associated with each candidate object trajectory of the first set of candidate object trajectories;
selecting a first candidate object trajectory from the first set of candidate object trajectories by applying a learned neural network cost model with the contact points to calculate respective energy for each grasp, the learned neural network cost model being trained based on an energy function using offline data associated with the agent; and
causing the agent to execute the first candidate object trajectory at a second time step of the number of future time steps.

9. The method of claim 8, the method further comprising:
receiving, at the second time step, a second grasp and a next object pose based on the first candidate object trajectory of the agent;
generating a second set of candidate object trajectories based on the second grasp and the next object pose, wherein candidate object trajectories of the second set of candidate object trajectories provide a number of object poses from the next object pose to the goal for a number of future time steps after the second time;
calculating contact points for grasps associated with each candidate object trajectory of the second set of candidate object trajectories;
selecting a second candidate object trajectory from the second set of candidate object trajectories based on the learned neural network cost model; and
causing the agent to execute the second candidate object trajectory at a second time step.

10. The method of claim 8, wherein candidate object trajectories are selected for the number of future time steps until the agent reaches the goal.

11. The method of claim 8, wherein the agent includes a number of end effectors for achieving a grasp of an object, wherein the grasp includes a contact sequence of the contact points.

12. The method of claim 11, wherein the grasp is based on adding or removing an end effector of a plurality of end effectors of the agent from or to the object.

13. The method of claim 8, wherein the first candidate object trajectory is selected based on a sample-based and gradient-based trajectory optimization.

14. The method of claim 8, wherein selecting the first candidate object trajectory is based on a low cost optimization.

15. A non-transitory computer readable storage medium storing instructions that when executed by a computer having a processor to perform a method for online iterative re-planning, the method comprising:
   receiving, at a first time step, a first grasp and an initial object pose of an agent;
   generating a first set of candidate object trajectories based on the first grasp and the initial object pose, wherein candidate object trajectories of the first set of candidate object trajectories provide a number of object poses from the initial object pose to a goal for a number of future time steps after the first time step;
   calculating contact points for grasps associated with each candidate object trajectory of the first set of candidate object trajectories;
   selecting a first candidate object trajectory from the first set of candidate object trajectories by applying a learned neural network cost model with the contact points to calculate respective energy for each grasp, the learned neural network cost model being trained based on an energy function using offline data associated with the agent; and
   causing the agent to execute the first candidate object trajectory at a second time step of the number of future time steps.

16. The non-transitory computer readable storage medium implemented in the method of claim 15, the method further comprising:
   receiving, at the second time step, a second grasp and a next object pose based on the first candidate object trajectory of the agent;
   generating a second set of candidate object trajectories based on the second grasp and the next object pose, wherein candidate object trajectories of the second set of candidate object trajectories provide a number of object poses from the next object pose to the goal for a number of future time steps after the second time;
   calculating contact points for grasps associated with each candidate object trajectory of the second set of candidate object trajectories;
   selecting a second candidate object trajectory from the second set of candidate object trajectories based on the learned neural network cost model; and
   causing the agent to execute the second candidate object trajectory at a second time step.

17. The non-transitory computer readable storage medium implemented method of claim 15, wherein the agent includes a number of end effectors for achieving a grasp of an object, wherein the grasp includes a contact sequence of the contact points.

18. The non-transitory computer readable storage medium implemented method of claim 17, wherein the grasp is based on adding or removing an end effector of a plurality of end effectors of the agent from or to the object.

19. The non-transitory computer readable storage medium implemented method of claim 15, wherein the first candidate object trajectory is selected based on a sample-based and gradient-based trajectory optimization.

20. The non-transitory computer readable storage medium implemented method of claim 15, wherein selecting the first candidate object trajectory is based on a low cost optimization.

* * * * *